No. 634,890. Patented Oct. 17, 1899.
E. P. HOARD.
ANIMAL POKE.
(Application filed Oct. 26, 1897.)
(No Model.)
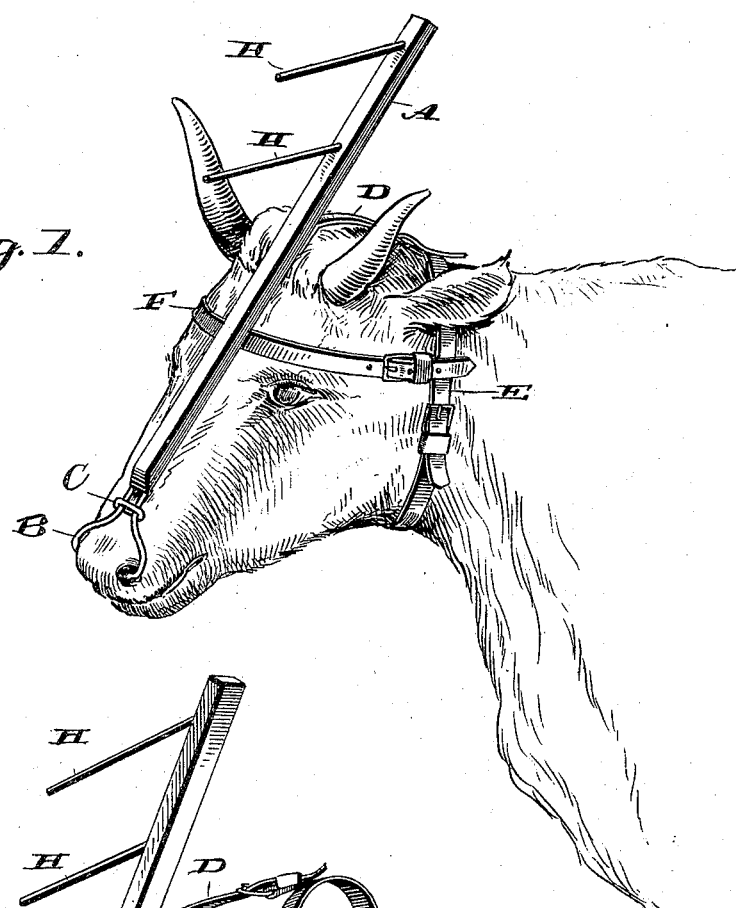
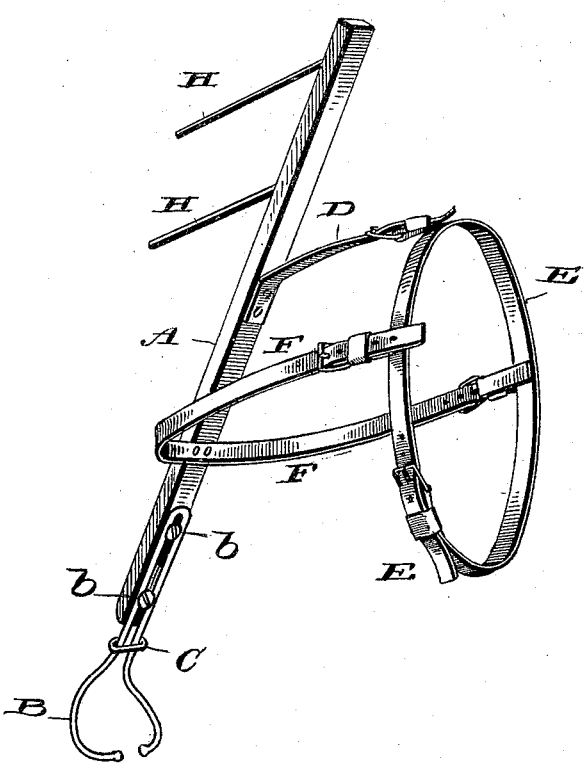

UNITED STATES PATENT OFFICE.

EUGENE PUTMAN HOARD, OF HOT SPRINGS, SOUTH DAKOTA.

ANIMAL-POKE.

SPECIFICATION forming part of Letters Patent No. 634,890, dated October 17, 1899.

Application filed October 26, 1897. Serial No. 656,455. (No model.)

*To all whom it may concern:*

Be it known that I, EUGENE PUTMAN HOARD, a citizen of the United States, residing at Hot Springs, in the county of Fall River and State of South Dakota, have invented certain new and useful Improvements in Animal-Pokes; and I do declare the following to be a full, clear, and exact description of the invention, such as will enable others skilled in the art to which it appertains to make and use the same, reference being had to the accompanying drawings, and to the letters of reference marked thereon, which form a part of this specification.

This invention relates to certain new and useful improvements in pokes of that class in which a bar provided with pins is arranged to extend centrally over the head of the animal and having means by which it is secured in position about the head, means also being provided to engage the nostrils of the animal.

The novelty resides in the peculiar construction and the combination and arrangement of parts, all as more fully hereinafter described and claimed.

The invention is clearly illustrated in the accompanying drawings, which, with the letters of reference marked thereon, form a part of this specification, and in which drawings—

Figure 1 is a perspective view of my poke shown as attached to a cow's head. Fig. 2 is a view showing the poke removed from the head of the animal.

Reference now being had to the details of the drawings by letter, A designates the poke-bar, which carries at its lower end the nostril-clasps B, made of a single piece of spring-wire bent upon itself and held to the said bar by means of retaining-screws $b$. The free ends of this wire are bent in the shape illustrated in the drawings, which shape is adapted to conform to the contour of the inner wall of the nostril of the animal. To adjust the nostril-clasps to the animal, the ring C is slid toward the free ends of the clasps and the ends of the same are held near the cartilage of the nostrils.

The bar A has secured to its rear side the strap D, which when the poke is attached to the head of the animal is adapted to pass up centrally over the head of the animal. Passed around the neck of the animal is the strap E, which has a buckle at one end, and a side strap F, which is attached at its longitudinal center to the rear side of the bar A, is connected at its ends by buckles to the neck-strap E. This strap F has a tendency, in connection with the strap D, to hold the poke directly in front of the head of the animal, and all of the straps coöperate to relieve the poke from normally resting on the nostrils of the animal, which if it were the case would cause an irritation to the tissue of the nostril.

On the front side of the poke are the downwardly-extending pins H, which are provided for the purpose of engaging on the boards or rails of a fence when the animal is attempting to pass through the same, and only when the pins are bearing against the rails of the fence does the pressure of the poke come upon the nostrils, which has a tendency to deter the animal from further attempt to pass through the fence. When the pins H engage with the fence, the weight of the poke is relieved from the straps and a slight vertical play is allowed to be imparted to the bar of the poke.

From the foregoing description, taken in connection with the drawings which form a part of this application, it will be seen that a poke constructed in accordance with my invention may be applied equally as well to a cow either with or without horns, and owing to the peculiar shape of the clasps may be applied to a cow without causing any irritation whatever to the nostrils or in any way inconvenience the animal, excepting when it may be attempting to pass through a fence.

I attach importance to the fact that the straps D and F are secured to the rear face of the bar, where they are in such position that the animal cannot rub the same against a post or other device, and thus disconnect the same from the bar. It is also deemed important that the said straps be disposed as shown, whereby I get a bearing and hold at the top of the head as well as upon the side, whereby the poke is securely held in position, and yet there is no danger of injury to the animal. For this latter reason also it is of great importance that the spring-arms of the nostril-clamps be curved as shown.

It will further be noted that by my construction the poke can be applied to an animal without horns, and by the peculiar disposition of the straps D and F, I obtain three independent bearings whereby the poke-bar is securely held against movement up or down and also laterally, the strap F, intermediate the nostril-clamps and the strap D and affording a hold at right angles to the latter, serving an important function toward the attainment of this end.

Having thus described my invention, what I claim to be new, and desire to secure by Letters Patent, is—

The improved animal-poke herein described consisting of the poke-bar provided near its upper end with pins extending forward therefrom, the neck-strap E with buckle, the strap secured at one end to the rear of said bar and its other end passed rearward over the head and adjustably connected to the neck-strap, the strap F secured at its center to the rear of the bar between the point of connection of the strap D with the bar, and the nostril-clamps and its ends adjustably connected to the neck-strap at right angles thereto and at right angles to the strap that passes over the head, whereby three independent bearings are provided, and the poke-bar held against lateral as well as up-and-down movement and the spring nostril-clasps on the lower end of said bar and comprising a single piece of spring-wire bent upon itself to form parallel portions lying flat against the rear face of the bar and the ends curved outward and rearward, means for holding the parallel portions adjustably on the bar, and a ring on said portions beyond the end of the bar, all substantially as shown and described.

In testimony whereof I affix my signature in presence of two witnesses.

EUGENE PUTMAN HOARD.

Witnesess:
W. R. MORGAN,
GEORGE GORHAM.